US009325678B2

(12) United States Patent
Jung et al.

(10) Patent No.: US 9,325,678 B2
(45) Date of Patent: Apr. 26, 2016

(54) APPARATUS AND METHOD FOR PROVIDING SECURITY SERVICE FOR GUEST NETWORK DEVICE IN A NETWORK

(75) Inventors: Dong-shin Jung, Suwon-si (KR); Joo-yeol Lee, Seoul (KR); Jae-shin Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1988 days.

(21) Appl. No.: 11/386,782

(22) Filed: Mar. 23, 2006

(65) Prior Publication Data
US 2006/0239452 A1 Oct. 26, 2006

(30) Foreign Application Priority Data
Apr. 25, 2005 (KR) .......................... 10-2005-0034010

(51) Int. Cl.
*H04L 29/06* (2006.01)
(52) U.S. Cl.
CPC ............ *H04L 63/062* (2013.01); *H04L 63/101* (2013.01); *H04L 63/0442* (2013.01); *H04L 63/08* (2013.01)
(58) Field of Classification Search
CPC .......................... H04L 63/0428; H04L 63/062
USPC ..................... 380/44–47, 277–278, 282, 255; 726/2–6, 8–10, 16–21, 27–30; 713/150, 153, 155, 168–171, 182–185; 709/223–224, 225, 227–229
See application file for complete search history.

(56) References Cited

U.S. PATENT DOCUMENTS

| 6,219,706 | B1* | 4/2001 | Fan et al. ...................... 709/225 |
| 6,609,154 | B1* | 8/2003 | Fuh et al. ...................... 709/225 |
| 6,694,025 | B1 | 2/2004 | Epstein et al. |
| 2001/0020274 | A1 | 9/2001 | Shambroom |
| 2001/0021884 | A1* | 9/2001 | Shinyagaito .................. 700/275 |
| 2002/0162019 | A1* | 10/2002 | Berry ...................... G06F 21/33 726/5 |

(Continued)

FOREIGN PATENT DOCUMENTS

| CN | 1604519 A | 4/2005 |
| JP | 2002-140155 A | 5/2002 |

(Continued)

OTHER PUBLICATIONS

Carl Ellison, DeviceSecurity:1 Service Template for UPnP Device Architecture 1.0, Nov. 17, 2003, pp. 1-65.*

(Continued)

*Primary Examiner* — Bradley Holder
*Assistant Examiner* — Canh Le
(74) *Attorney, Agent, or Firm* — Sughrue Mion, PLLC

(57) ABSTRACT

An apparatus for providing a security service includes a key generation unit which generates a pair of keys including a first temporary public key and a first temporary private key for a network device that will be connected with a network form the outside, a temporary access control list generation unit which generates a first temporary access control list including the first temporary public key for an internal network device, an authentication unit which performs authentication when the network device joins in the network, and a first transmission/reception unit which transmits the pair of keys including the first temporary public key and the first temporary private key to the network device according to the authentication result.

13 Claims, 14 Drawing Sheets

(56) References Cited

U.S. PATENT DOCUMENTS

| | | | |
|---|---|---|---|
| 2003/0056099 A1* | 3/2003 | Asanoma et al. | 713/172 |
| 2003/0163701 A1* | 8/2003 | Ochi et al. | 713/175 |
| 2003/0172298 A1* | 9/2003 | Gunter ............ G06F 21/6218 | 713/156 |
| 2003/0229689 A1* | 12/2003 | Raghavan et al. | 709/223 |
| 2004/0268119 A1* | 12/2004 | Smetters et al. | 713/155 |
| 2005/0010763 A1* | 1/2005 | Matsui et al. | 713/165 |
| 2005/0071636 A1* | 3/2005 | Lee et al. | 713/170 |
| 2005/0188193 A1* | 8/2005 | Kuehnel et al. | 713/155 |
| 2005/0201564 A1* | 9/2005 | Kayashima et al. | 380/283 |
| 2005/0240996 A1* | 10/2005 | Hitchcock | 726/17 |
| 2005/0266826 A1* | 12/2005 | Vlad | 455/410 |
| 2006/0037036 A1* | 2/2006 | Min et al. | 725/1 |
| 2006/0095574 A1* | 5/2006 | Stirbu et al. | 709/227 |
| 2006/0143295 A1* | 6/2006 | Costa-Requena et al. | 709/227 |
| 2006/0156388 A1* | 7/2006 | Stirbu et al. | 726/4 |
| 2006/0236105 A1* | 10/2006 | Brok et al. | 713/169 |

FOREIGN PATENT DOCUMENTS

| | | |
|---|---|---|
| JP | 2002-271309 A | 9/2002 |
| JP | 2003-501877 A | 1/2003 |
| JP | 2004-501532 A | 1/2004 |
| JP | 2004-040156 A | 2/2004 |
| JP | 2004096755 A | 3/2004 |
| JP | 2006311516 A | 11/2006 |
| KR | 10-2004-0074713 A | 8/2004 |
| WO | 00/74297 A2 | 12/2000 |
| WO | WO 01/22661 A2 | 3/2001 |
| WO | 01/74005 A1 | 10/2001 |

OTHER PUBLICATIONS

Carl Ellison, UPnP Security Ceremonies Design Document for UPnP Device Architecture 1.0, Oct. 3, 2003, pp. 1-18.*
Thomas R. Henderson, Boeing Phantom works, "Host Mobility for IP Networks: A Comparison," IEEE network, Nov./Dec. 2003, pp. 18-26.*
Jianliang Zheng and Myrung J. Lee, "Will IEEE 802.15.4 Make Ubiquitous Networking a Reality?: A Discussion on a Potential Low Power Low Bit Rate Standard," IEEE Communications Magazine, Jun. 2004, pp. 140-146.*
Communication dated Jul. 29, 2011 from the European Patent Office in counterpart European Patent Application No. 06112858.3.

* cited by examiner

```
<entry>
    <subject> {<hash>, <name> or <any/>} </subject>
    <may-not-delegate/>
    <access> {mfgr def'd permission elements or <all/>} </access>
    <valid> {optional <not-before> and/or <not-after> elements}
</valid>
</entry>
```

APPARATUS AND METHOD FOR PROVIDING SECURITY SERVICE FOR GUEST NETWORK DEVICE IN A NETWORK

CROSS-REFERENCE TO RELATED APPLICATION

This application claims priority from Korean Patent Application No. 10-2005-0034010 filed on Apr. 25, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to home network devices, and more particularly, to providing a security service, by which, when a predetermined network device joins a network, internal network devices can be controlled within a limited authority or a limited service can be provided to the internal network devices without registering the predetermined network device.

2. Description of the Related Art

A home network includes at least two digital home devices that communicate with each other. Digital home devices include a circuit capable of processing digital data and examples thereof include a computer, a printer, a scanner, a pager, a digital camera, a facsimile, a digital duplicator, a personal digital assistant (PDA), a cellular phone, a digital telephone, a digital projector, a digital video recorder, a digital camcorder, a digital television (TV) broadcasting receiver, a set-top box, a digital refrigerator, a washing machine, a microwave oven, an electric rice cooker, a heater/cooler, illumination, a gas powered boiler, etc.

Various network devices on a home network are connected using middleware in a peer-to-peer fashion, the middleware enabling the network devices to communicate on the home network. Middleware examples include Home AV Interoperability (HAVI), Universal Plug and Play (UPnP), Java Intelligent Network Infra-structure (JINI), and LonWorks.

Network devices can be grouped into a network using middleware and each of the network devices on the network is connected to a temporary computing environment to provide various services to users according to its characteristic features.

In general, a home network system includes a control point (CP) for controlling other network devices, a controlled device (CD) for providing a specific service under the control of the CP, and a security console (SC) for providing a security service between the CP and the CD.

In an UPnP-based home network system, a CP can restrict the use of a service provided by a CD to provide a predetermined security service. More specifically, a CD stores an access control list (ACL) that includes information about an authority of a CP to access a CD or information about restrictions of an allowed service after the access. The ACL can be edited only by an SC to cause a CD to provide a designated service only to a predetermined CP.

A process of providing a security service in a conventional UPnP-based home network will be described in more detail with reference to FIG. 1.

In order for a CP to control a CD or for a CD to provide a specific service under the control of a CP within a predetermined network, information of a CP and a CD should be registered in an SC (S1000 and S2000).

Regarding the registration, when joining a predetermined network, a CP 30 generates and transmits a search message for searching for an SC 20 in operation S110.

Upon receiving the search message from the CP 30, the SC 20 generates a response message and transmits the same to the CP 30 in operation SI 20. Upon receiving the response message from the SC 20, the CP 30 generates a public key in operation S130 and transmits the same to the SC 20 in operation S140.

Upon receiving the public key from the CP 30, the SC 20 outputs the information received through a display unit (not shown). A user then selects the public key of the CP 30 to join the network from the output information and designates a name in operation S150, thereby completing the registration in the SC 20 in operation S160.

When joining a predetermined network, a CD 10 transmits a predetermined message to inform other network devices on the network of its existence in operation S210. Upon receiving the message from the CD 10, the SC 20 recognizes the CD 10 in operation S220 and requests a public key from the CD 10 as a response to the message in operation S230. Upon receiving the request for the public key from the SC 20, the CP 30 generates the public key in operation S240 and transmits the same to the SC 20 in operation S250.

Upon receiving the public key from the CP 30, the SC 20 outputs the information received through a display unit (not shown). A user then selects the public key of the CP 30 to join the network from the output information and designates a name in operation S260. The SC 20 requests control right in operation S270 and the CD 10 transmits the control right to the SC 20 in operation S280. Registration in the SC 20 is then completed in operation S290.

Upon completing the registration of the CD 10 and the CP 30 in the SC 20, a user can edit an ACL stored in the CD 10 through the SC 20 in operation S295. In other words, the public key of the registered CP 30 can be added to the ACL of the CD 10. At this time, a process of editing the ACL of the CD 10 complies with a conventional UPnP security mechanism.

Upon completing the editing of the ACL of the CD 10, the CP 30 can control the CD 10 in operation S297.

As described above, a conventional method of providing a UPnP security service is implemented by registering information of a PD and a CP in an SC.

As a result, when a new CD or CP desires to temporarily join a home network, the CD or CP should be registered in the SC. In other words, a CD or a CP (hereinafter, a guest device) whose information is not registered in an SC cannot join a network without registration.

In addition, in a conventional method of providing a UPnP security service authentication of a network device depends on an SC. As a result, when an SC does not exist or does not operate to authenticate the network device, authentication of a new network device cannot be performed.

PCT/KR01/022661 discloses a method for registering a device in a wireless home network. More specifically, when an ID code is received by an access point from a network device, an authorization key is transmitted to the network device according to a checking result, and the network device having the authorization key is registered in a home network.

However, PCT/KR01/022661 does not disclose a technique for authenticating a network device that desires to temporarily join a home network.

SUMMARY OF THE INVENTION

The present invention provides an apparatus and method for providing a security service, by which, when a network device joins a home network, the network device can be connected to internal network devices and perform a limited operation without having its information registered in a security console.

The present invention also provides an apparatus and method for providing a security service, by which, when a network device joins a home network from the outside, the network device can be authenticated without the intervention of a security console.

According to an aspect of the present invention, there is provided an apparatus for providing a security service, the apparatus including a key generation unit generates a pair of keys including a first temporary public key and a first temporary private key for a network device that will be connected with a network from the outside, a temporary access control list generation unit generates a first temporary access control list including the first temporary public key for an internal network device, a authentication unit performs authentication when the network device joins in the network, a first transmission/reception unit transmits the pair of keys including the first temporary public key and the first temporary private key to the network device according to the authentication result.

According to another aspect of the present invention, there is provided an apparatus for providing a security service, the apparatus including a storage unit which stores authentication information, a first transmission/reception unit which transmits the authentication information to a security console providing the security service between internal network devices within a predetermined network and receives a pair of keys including a temporary public key and a temporary private key from the security console according to the authentication result when a network device joins the predetermined network, and a control unit which controls the internal network device using the pair of keys including the temporary public key and the temporary private key.

According to still another aspect of the present invention, there is provided an apparatus for providing a security service, the apparatus including a storage unit which stores authentication information; a transmission/reception unit which transmits the authentication information to a security console providing the security service between internal network devices within a predetermined network and receives a public key of a network device from the security console according to the authentication result when the network device joins the predetermined network; and a temporary access control list generation unit which adds the public key to a first temporary access control list for the internal network device.

According to yet another aspect of the present invention, there is provided a method for providing a security service, the method including generating a pair of keys including a first temporary public key and a first temporary private key, generating a first temporary access control list including the first public key, authenticating a network device that joins a network from the outside, and transmitting the pair of keys including the first temporary public key and the first temporary private key to the network device according to the authentication result.

According to a further aspect of the present invention, there is provided a method for providing a security service, the method including transmitting authentication information to a security console providing the security service between internal network devices within a predetermined network when a network device joins the predetermined network; receiving a pair of keys including a temporary public key and a temporary private key according to the authentication result; switching an operation mode of the network device after the receiving of the pair of keys; and receiving a service from the internal network device using the temporary public key after the switching of the operation mode of the network device.

According to yet a further aspect of the present invention, there is provided a method for providing a security service, the method including transmitting authentication information to a security console providing the security service between internal network devices within a predetermined network when a network device joins the predetermined network; receiving a public key of the network device from the security console according to the authentication result; adding the public key to a temporary access control list; and providing a service to the internal network device based on the temporary access control list.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
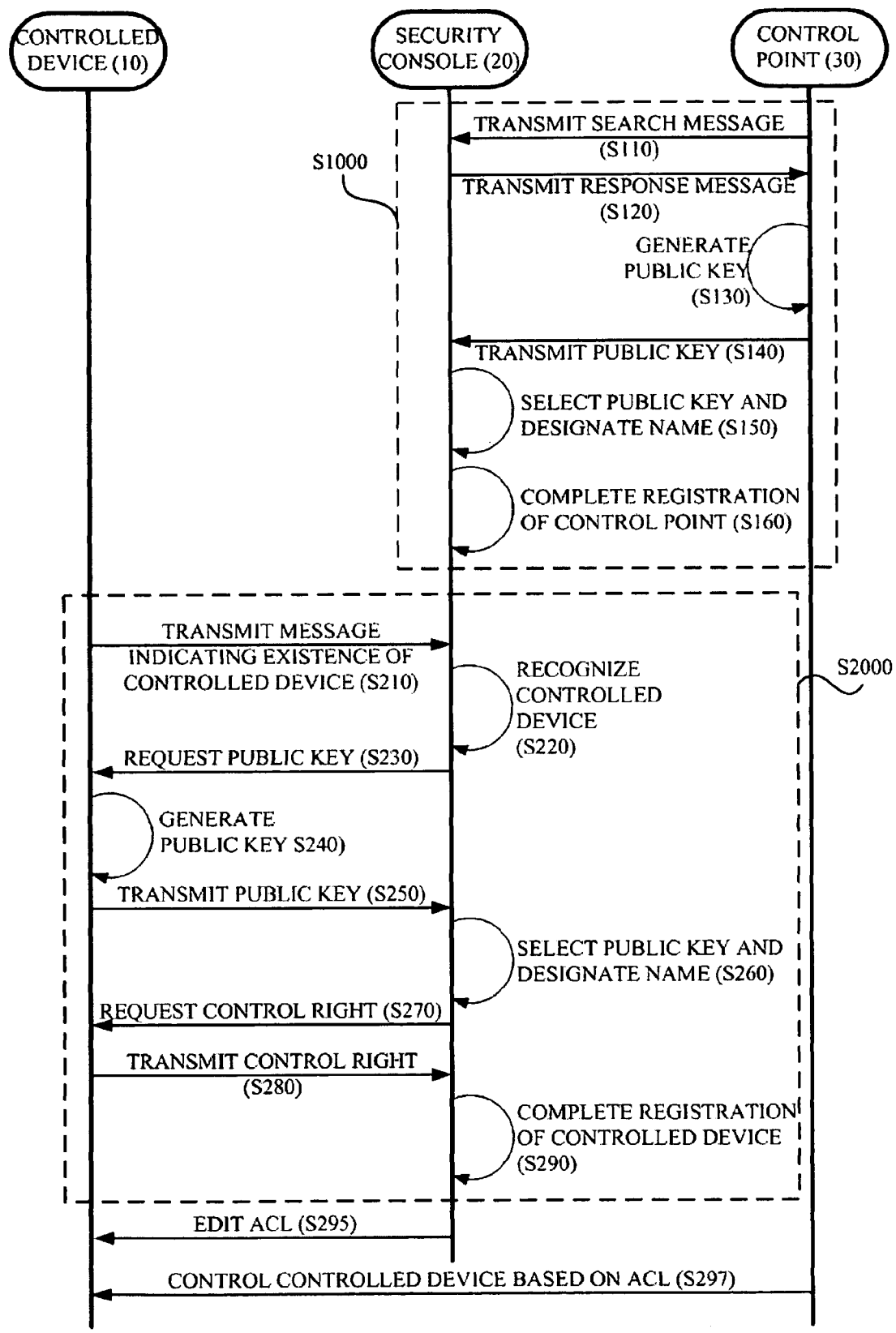
FIG. 1 is a conceptual view of a process of providing a security service in a conventional UPnP-based home network.

The present invention will now be described more fully with reference to the accompanying drawings, in which exemplary embodiments of this invention are shown. Advantages and features of the present invention and methods of accomplishing the same may be understood more readily by reference to the following detailed description of exemplary embodiments and the accompanying drawings.

The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will be described with respect to a home network system as a representative example of a local network. The home network system of the present invention includes a management device, a control point, and a controlled device, however, the present invention is not limited to this. In addition, a management device, a control point, and a controlled device described in the present invention are assumed to be connected in a home network environment using UPnP middleware. However, it will be understood by those of ordinary skill in the art that various types of middleware such as JINI, HAVI, and HWW can be used.

An apparatus and method for providing a security service according to the present invention is described hereinafter with reference to flowchart illustrations of methods according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 2A:
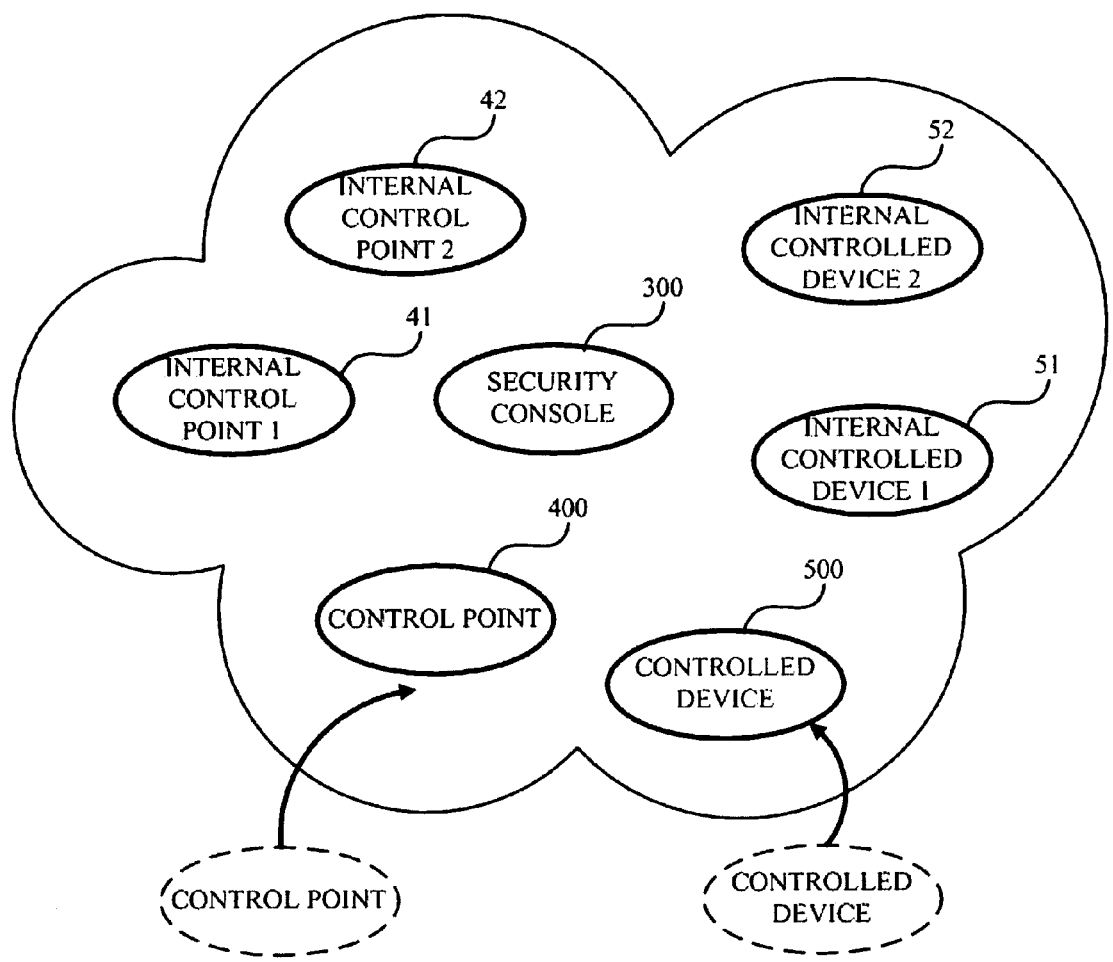
FIGS. 2A and 2B illustrate home network systems according to exemplary embodiments of the present invention.
Figure 2B:
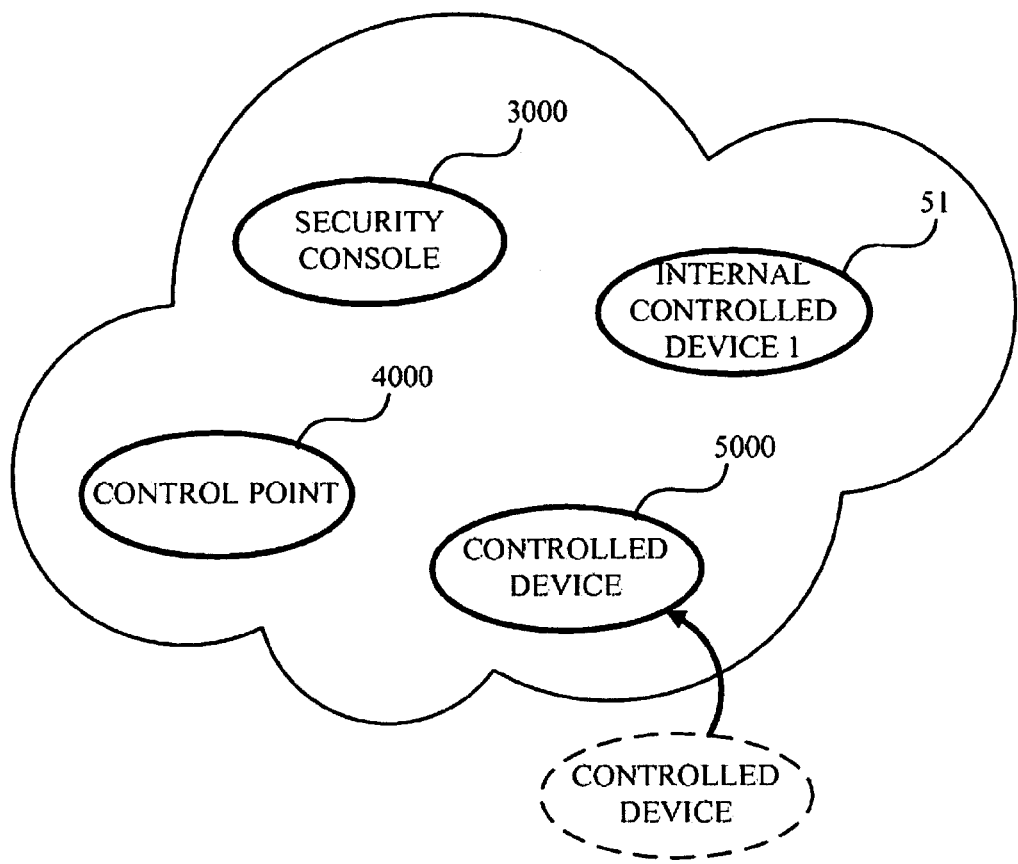

FIGS. 2A and 2B illustrate home network systems according to exemplary embodiments of the present invention.

The home network systems illustrated in FIGS. 2A and 2B include at least one security console 300 and 3000, at least one control point 400 and 4000, and at least one controlled device 500 and 5000. Each of the security console 300 and 3000, the control point 400 and 4000, and the controlled device 500 and 5000 stores a pair of keys including a public key and a private key. The public key and the private key are used to encrypt messages between network devices or decrypt encrypted messages.

Referring to FIG. 2A, according to an exemplary embodiment of the present invention, when a network device joins a home network from the outside, the security console 300 can output a screen (900 of FIG. 4) in which an operation mode of the network device can be selected. At this time, the operation mode of the network device can be selectively input by a user. The security console 300 authenticates the network device to enable the network device to be connected to other internal network devices. In other words, the security console 300 transmits a pair of keys including a first temporary public key and a first temporary private key applied to first temporary access control lists of internal controlled devices 51 and 52 to the control point 400 joining the home network from the outside or transmits a pre-registered public key of internal control points 41 and 42 to the controlled device 500 joining the home network from the outside. A more detailed description thereof will be given later with reference to FIG. 3A.

After the control point 400 is authenticated by the security console 300, it receives a pair of keys including a first temporary public key and a first temporary private key from the security console 300. The control point 400 can request a predetermined service from the controlled device 500 in the home network using the first temporary public key. A more detailed description thereof will be given later with reference to FIG. 4.

According to an exemplary embodiment of the present invention, the controlled device 500 stores an access control list and a temporary access control list. The access control list stores information about the control point 400 within the network, service control items that can be provided to the control point 400, and access control information for providing a service requested by the control point 400. For example, when the controlled device 500 is an audio device, the service control items may include service items such as playback, volume control, and music file downloading.

On the other hand, the temporary access control list stores access control information for providing a predetermined service to the internal control points 41 and 42 of the network when the controlled device 500 joins the network. At this time, the service control items included in the temporary access control list may be restrictive when compared to those included in the access control list in order to protect the controlled device 500 from the internal control points 41 and 42. For example, when the controlled device 500 is an audio device, the service control items of the temporary access control list may include basic functions of the audio device such as power supply and playback.

After the security console 400 authenticates the controlled device 500, the controlled device 500 joining the home network receives a public key of the internal control points 41 and 42 from the security console 400 and edits the generated temporary access control list using the received public key. As a result, the controlled device 300 can provide services to the internal control points 41 and 42. A more detailed description thereof will be given later with reference to FIG. 5A.

Figure 3A:
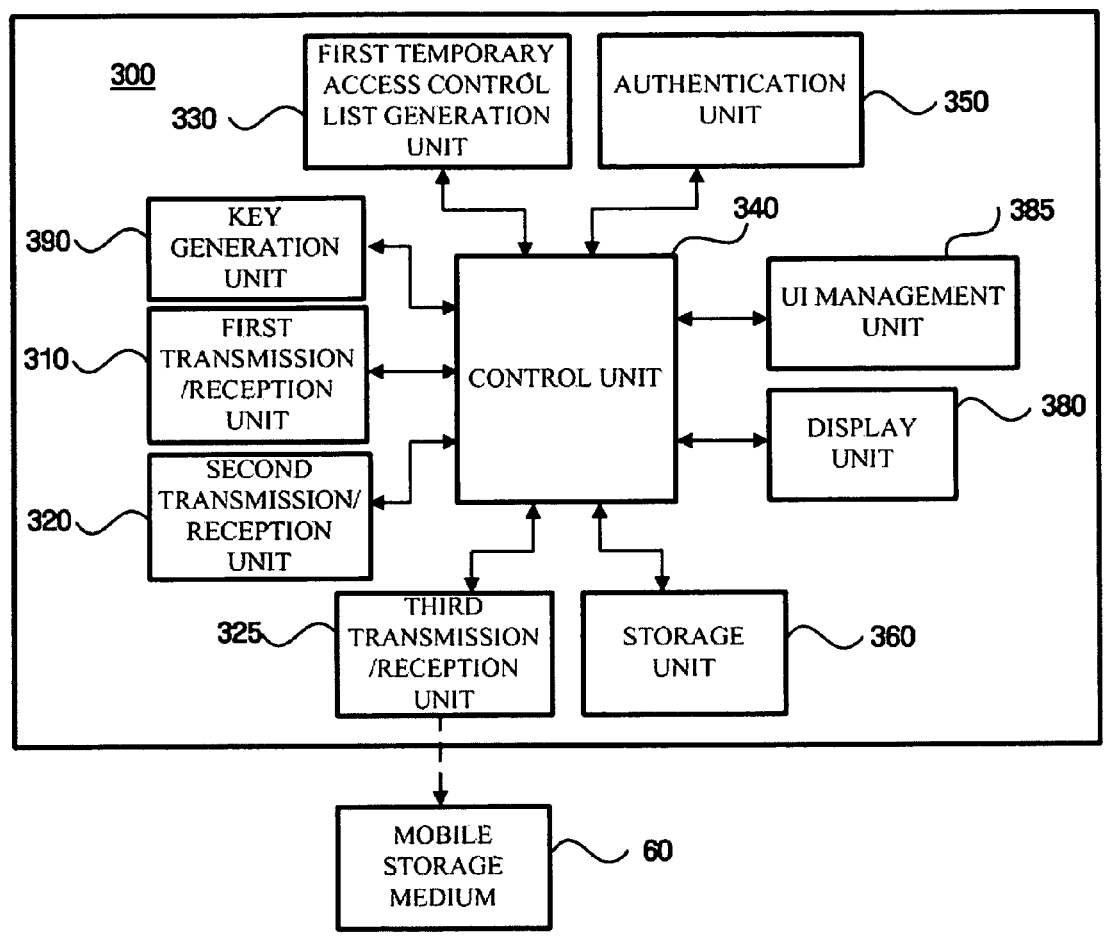
FIG. 3A is a block diagram of a security console in the home network system of FIG. 2A, according to an exemplary embodiment of the present invention.
Figure 3B:
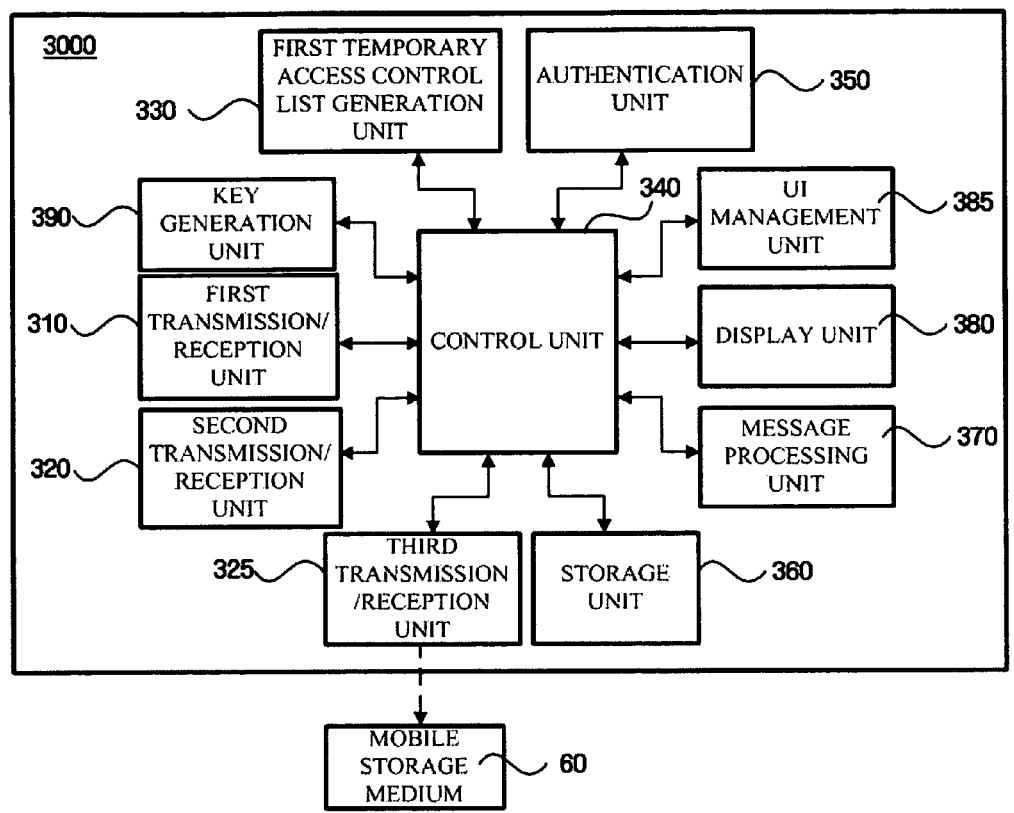
FIG. 3B is a block diagram of a security console in the home network system of FIG. 2B, according to another exemplary embodiment of the present invention.

FIG. 3A is a block diagram of the security console 300 in the home network system of FIG. 2A according to an exemplary embodiment of the present invention, and FIG. 3B is a block diagram of a security console in the home network system of FIG. 2B, according to another exemplary embodiment of the present invention;

Referring to FIG. 3A, the security console 300 includes a key generation unit 390, a first temporary access control list generation unit 330, a first transmission/reception unit 310, a second transmission/reception unit 320, an authentication unit 350, a storage unit 360, a display unit 380, a user interface (UI) management unit 385, and a control unit 340.

The term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The key generation unit 390 generates a pair of keys including a first temporary public key and a first temporary private key. At this time, the first temporary public key is used to edit a first temporary access control list of the internal controlled device 51. It is preferable that the pair of the first temporary public key and the first temporary private key be generated before a network device joins the home network from the outside.

The first temporary access control list generation unit 330 edits the first temporary access control list of the internal controlled device 51 using the first temporary public key generated by the key generation unit 390. Here, editing includes erasing or changing contents of the existing first temporary access control list or adding new access control information to the existing first temporary access control list. The first temporary access control list stores information required by the control point 400 to access and control the internal controlled device 51 when the control point 400 joins the home network from the outside.

The first transmission/reception unit 310 transmits and receives data between the security console 300 and the control point 400. For example, when the control point 400 joins the home network from the outside, the first transmission/reception unit 310 receives a search message received from the control point 400 or a public key and authentication information of the control point 400.

The first transmission/reception unit 310 transmits a public key request message or an authentication information request message to the control point 400. If the security console 300 successfully authenticates the control point 400 that is joining the home network from the outside, the first transmission/reception unit 310 transmits the pair of keys including the first temporary public key and the first temporary private key generated by the key generation unit 390 to the control point 400.

When a plurality of control points 400 joins the network from the outside, the first transmission/reception unit 310 may transmit the pair of keys of the first temporary public key and the first temporary private key to the control points 400.

The second transmission/reception unit 320 transmits and receives data between the security console 300 and the controlled device 500. For example, when the controlled device 500 joins the home network from the outside, the second transmission/reception unit 320 receives a message indicating the existence of the controlled device 500 or a public key and authentication information of the controlled device 500.

Alternatively, the second transmission/reception unit 320 transmits a public key request message or an authentication information request message to the controlled device 500. If the security console 300 successfully authenticates the controlled device 500 joining the home network from the outside, the second transmission/reception unit 320 transmits a pre-registered public key of the internal control points 41 and 42 to the controlled device 500.

If a plurality of controlled devices 500 joins the home network from the outside, the second transmission/reception unit 320 may transmit a pre-registered public key of the control points 41 and 42 to the controlled devices 500. At this time, at least one public key of the control points 41 and 42 may be transmitted by the second transmission/reception unit 320.

The second transmission/reception unit 320 may be separately implemented as hardware or may be implemented together with the first transmission/reception unit 310.

The display unit 380 may display information transmitted from the network devices 400 and 500, e.g., a public key and authentication information of the network devices 400 and 500. The display unit 380 outputs a user interface (UI) into which operation modes of the network devices 400 and 500 can be selectively input. The display unit 380 may be separately implemented or implemented together with an input unit into which a user's command can be input, such as a touch panel or a touch screen.

The UI management unit 385 provides a UI that allows selection of the operation modes of the network devices 400 and 500 joining the home network from the outside. According to an exemplary embodiment of the present invention, the operation modes of the network devices 400 and 500 include a normal mode and a guest mode, and can be selectively input by a user.

Figure 4:
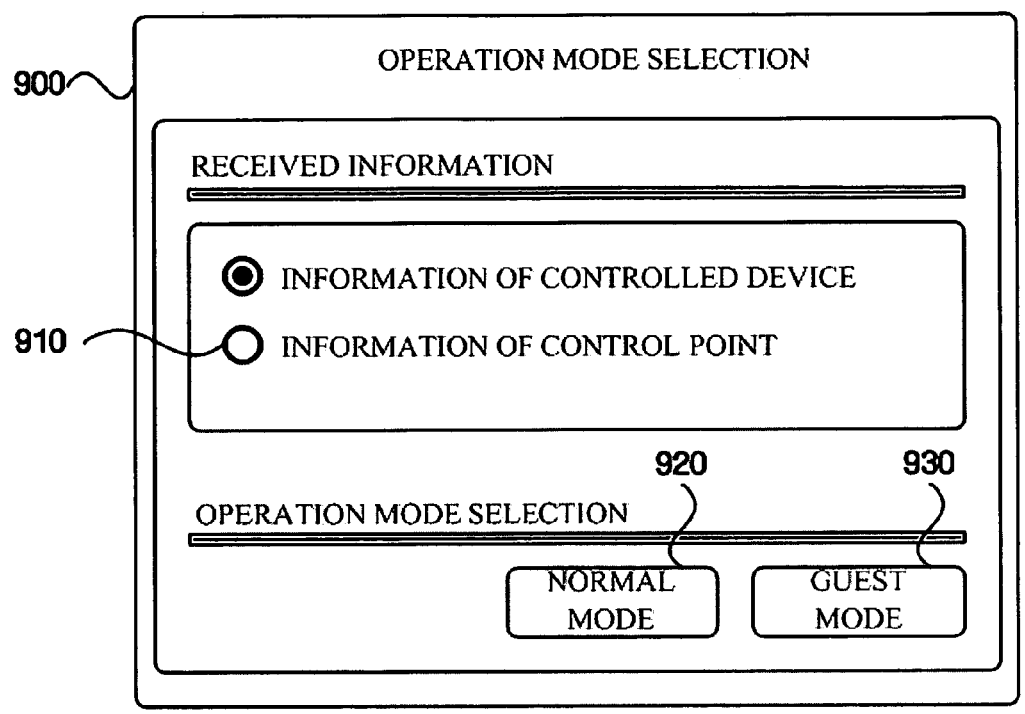
FIG. 4 illustrates a screen in which an operation mode of a network device can be selected according to an exemplary embodiment of the present invention.

FIG. 4 illustrates the screen 90 provided by the UI management unit 385, in which an operation mode can be selected. As illustrated in FIG. 4, the screen 900 in which the operation modes of the network devices 400 and 500 can be selected may include a selection button 910, a normal mode button 920, and a guest mode button 930.

The selection button 910 allows a user to select a predetermined network device among a plurality of network devices. More specifically, when a plurality of network devices 400 and 500 join the home network from the outside, information transmitted from the network devices 400 and 500 can be displayed on the display unit 380. At this time, the user can select a predetermined network device using the selection button 910.

The normal mode button 920 sets the operation modes of the selected network devices 400 and 500 to normal modes. When the normal mode button 920 is selected, the selected network devices 400 and 500 are registered in the security console 300 according to a conventional UPnP security mechanism.

On the other hand, the guest mode button 930 sets the operation modes of the selected control point 400 and controlled device 500 to guest modes. When the guest mode button 930 is selected, the selected network devices 400 and 500 are authenticated by the security console 300 and enter a state where they can communicate with the internal network devices 51, 52, 41, and 42. A description thereof will be given later with reference to FIGS. 8 and 9.

The authentication unit 350 performs authentication of the network devices 400 and 500 joining the network from the outside. When the operations modes of the network devices 400 and 500 are set to guest modes, the authentication unit 350 requests predetermined authentication information from the network devices 400 and 500.

Once authentication information, e.g., serial numbers of the network devices 400 and 500, are received from the network devices 400 and 500, the received authentication information is output through the display unit 380. At this time, a user may check the output authentication information and authenticate the network devices 400 and 500. When the user inputs an authentication confirm command, the authentication unit 350 allows the network devices 400 and 500 to communicate with the internal network devices 41, 42, 51, and 52. In other words, the authentication unit 350 may transmit the pair of keys including the first temporary public key and the first temporary private key generated by the key generation unit 390 to the control point 400 through the first transmission/reception unit 310 or the public key of the internal control points 41 and 42 to the controlled device 500 through the second transmission/reception unit 320.

The storage unit 360 may store information contained in the internal network device 41, 42, 51 and 52, i.e., a public keys of the control points 41 and 42 or a public keys of the controlled devices 51 and 52 within the home network. The storage unit 360 may also store the pair of keys including the first temporary public key and the first temporary private key generated by the key generation unit 390. The storage unit 360 may be, but is not limited to, a memory device such as a read-only memory (ROM), a programmable ROM (PROM), an erasable PROM (EPROM), an electrically EPROM (EEPROM), a random access memory (RAM), or a flash memory.

The control unit 340 controls components within the security console 300. For example, the control unit 340 extracts a public key of the control point 400 from registration information stored in the storage unit 360. When the controlled device 500 joins the home network and is successfully authenticated, the control unit 340 transmits an extracted public keys of the control points 41 and 42 to the controlled device 500 through the second transmission/reception unit 320.

The security console 300, according to an exemplary embodiment of the present invention, may further include a third transmission/reception unit 325. The third transmission/reception unit 325 can transmit and receive data between a mobile storage medium 60 such as a smart card and the security console 300. For example, the third transmission/reception unit 325 may transmit the pair of keys including the first temporary public key and the first temporary private key generated in the key generation unit 390 to the mobile storage medium 60. Alternatively, the third transmission/reception unit 325 may transmit the public key of the control points 41 and 42 extracted by the control unit 340 to the mobile storage medium 60.

Next, the security console 3000 in the home network system of FIG. 2B according to another exemplary embodiment of the present invention will be described with reference to FIG. 3B. As illustrated in FIG. 3B, the security console 3000 may further include a message processing unit 370 in addition to the configuration illustrated in FIG. 3A.

Figure 5A:
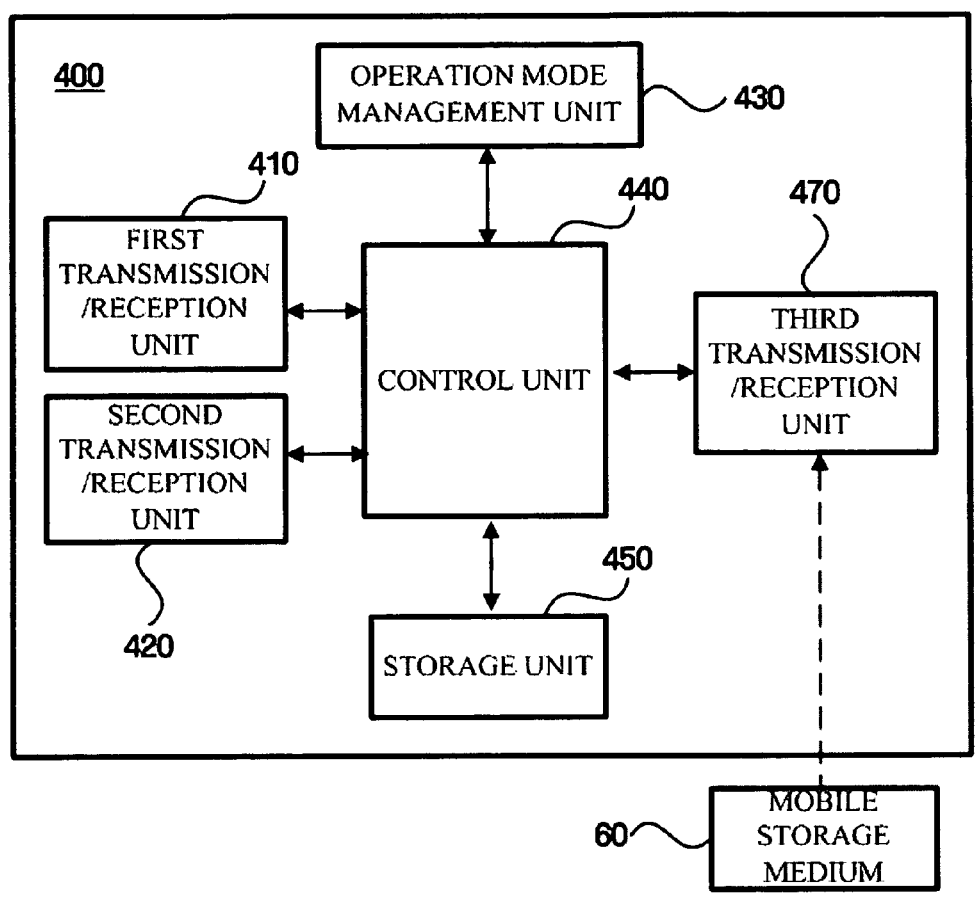
FIG. 5A is a block diagram of a control point in the home network system of FIG. 2A, according to an exemplary embodiment of the present invention.
Figure 5B:
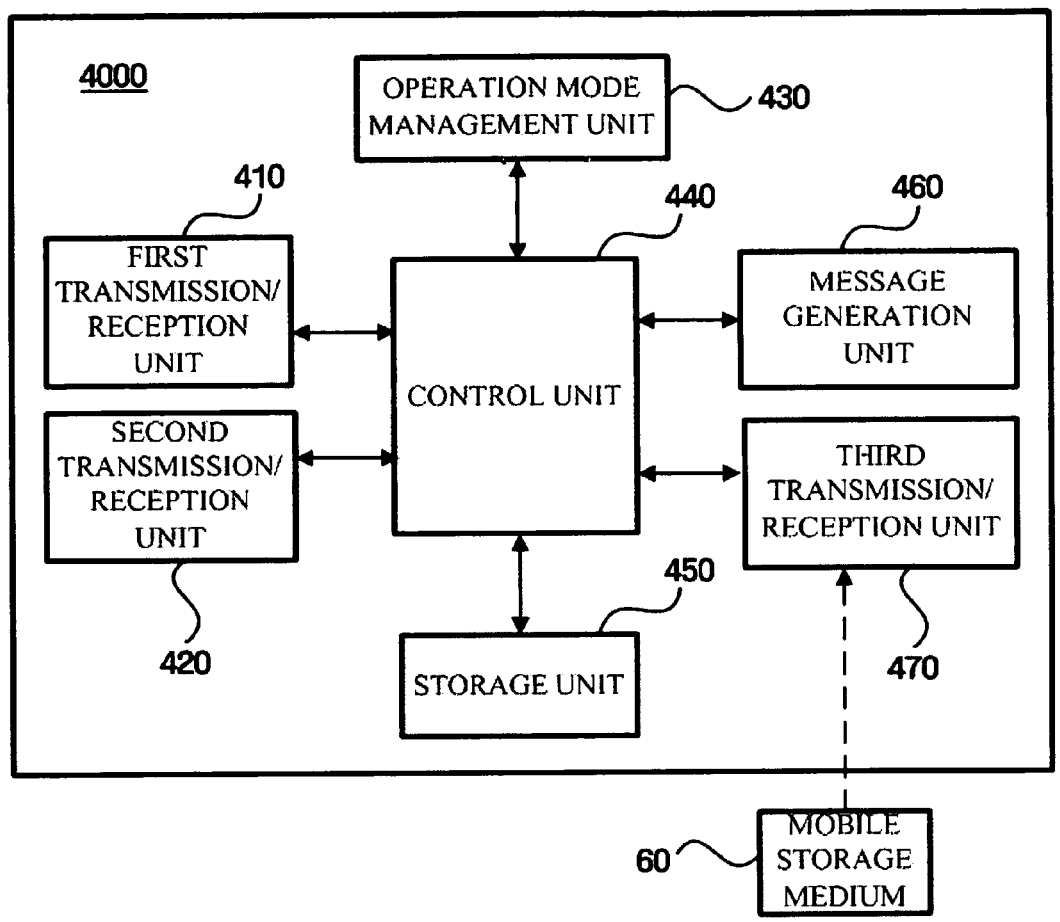
FIG. 5B is a block diagram of a control point in the home network system of FIG. 2B, according to another exemplary embodiment of the present invention.

The message processing unit 370 determines whether an access control confirm message is received from a control point 4000 (see FIG. 5B). The access control confirm message is generated by a message generation unit 460 of the control point 4000 when the control point 4000 receives an access control reject message from a controlled device 5000 (see FIG. 6B).

If the access control confirm message is not received, the message processing unit 370 waits to receive the access control confirm message. If the access control confirm message is received, the message processing unit 370 transmits a pair of keys including a second temporary public key and a second temporary private key received from the controlled device 5000 to the control point 4000. A more detailed description thereof will be given later with reference to FIG. 10.

FIGS. 5A and 5B are block diagrams of the control point 400 and the control point 4000, respectively, according to exemplary embodiments of the present invention.

First, the control point 400 described in FIG. 5A includes a storage unit 450, a first transmission/reception unit 410, a second transmission/reception unit 420, a third transmission/reception unit 470, an operation mode management unit 430, and a control unit 440.

The storage unit 450 may store authentication information of the control point 400 such as a serial number or an ID and a pair of keys including a public key and a private key of the control point 400. The pair of keys including the public key and the private key of the control point 400 may be used to encrypt and decrypt data exchanged between the control point 400 and a network device, e.g., the security console 300 and the controlled device 51.

The storage unit 450 may store the pair of keys including the first temporary public key and the first temporary private key from the security console 300. The storage unit 450 may be, but not is limited to, a memory device such as an ROM, a PROM, an EPROM, an EEPROM, an RAM, or a flash memory.

The first transmission/reception unit 410 transmits and receives data between the control point 400 and the security console 300. For example, the first transmission/reception unit 410 may receive the public key request message or the authentication information request message from the security console 300. When the security console 300 successfully authenticates the control point 400, the first transmission/reception unit 410 may receive the pair of keys including the first temporary public key and the first temporary private key from the security console 300.

Alternatively, the first transmission/reception unit 410 may transmit a search message for searching for the security console 300 and a public key and authentication information of the control point 400 to the security console 300.

The second transmission/reception unit 420 transmits and receives data between the control point 400 and the controlled device 51. For example, the second transmission/reception unit 420 may transmit a control signal requesting a predetermined service from the controlled device 51. The second transmission/reception unit 420 may be separately implemented as hardware or integrated with the first transmission/reception unit 410.

The operation mode management unit 430 may switch the operation mode of the control point 400 to a predetermined mode. According to an exemplary embodiment of the present invention, the operation mode of the control point 400 includes a normal mode and a guest mode. In the normal mode, a control signal including the public key of the control point 400 is generated when the control point 400 requests a predetermined service from the internal controlled device 51. In the guest mode, a control signal including a first temporary public key received from the security console 300 is generated when the control point 400 requests a predetermined service from the internal controlled device 51.

When the control point 400 joins a predetermined network and is set to operate in the normal mode, the control point 400 is registered in the security console 300 according to a conventional UPnP mechanism.

When the operation mode of the control point 400 is set to operate in the guest mode, the control point 400 is authenticated by the security console 300 and receives the pair of keys including the first temporary public key and the first temporary private key from the security console 300. Upon receiving the pair of keys including the first temporary public key and the first temporary private key from the security console 300, the operation mode of the control point 400 is switched to the guest mode by the operation mode management unit 430. The control point 400 switched to the guest mode can control the internal controlled devices 51 and 52 using the first temporary public key. This is because the internal controlled devices 51 and 52 store the first temporary access control list including the first temporary public key.

In addition to the configuration described above, the control point 400 may further include a third transmission/reception unit 470. The third transmission/reception unit 470 can transmit and receive data between the mobile storage medium 60 such as a smart card and the control point 400. For example, the third transmission/reception unit 470 may receive the pair of keys including the first temporary public key and the first temporary private key from the mobile storage medium 60.

Next, the control point 4000 described in FIG. 5B may further include the message generation unit 460 in addition to the configuration illustrated in FIG. 5A.

The message generation unit 460 determines whether an access control reject message is received from the controlled device 5000. If the access control reject message is not received, the message generation unit 460 waits for the reception of the access control reject message. If the access control reject message is received, the message generation unit 460 generates the access control confirm message. The message generation unit 460 then transmits the access control confirm message to the security console 3000 through the first transmission/reception unit 410.

Figure 6A:
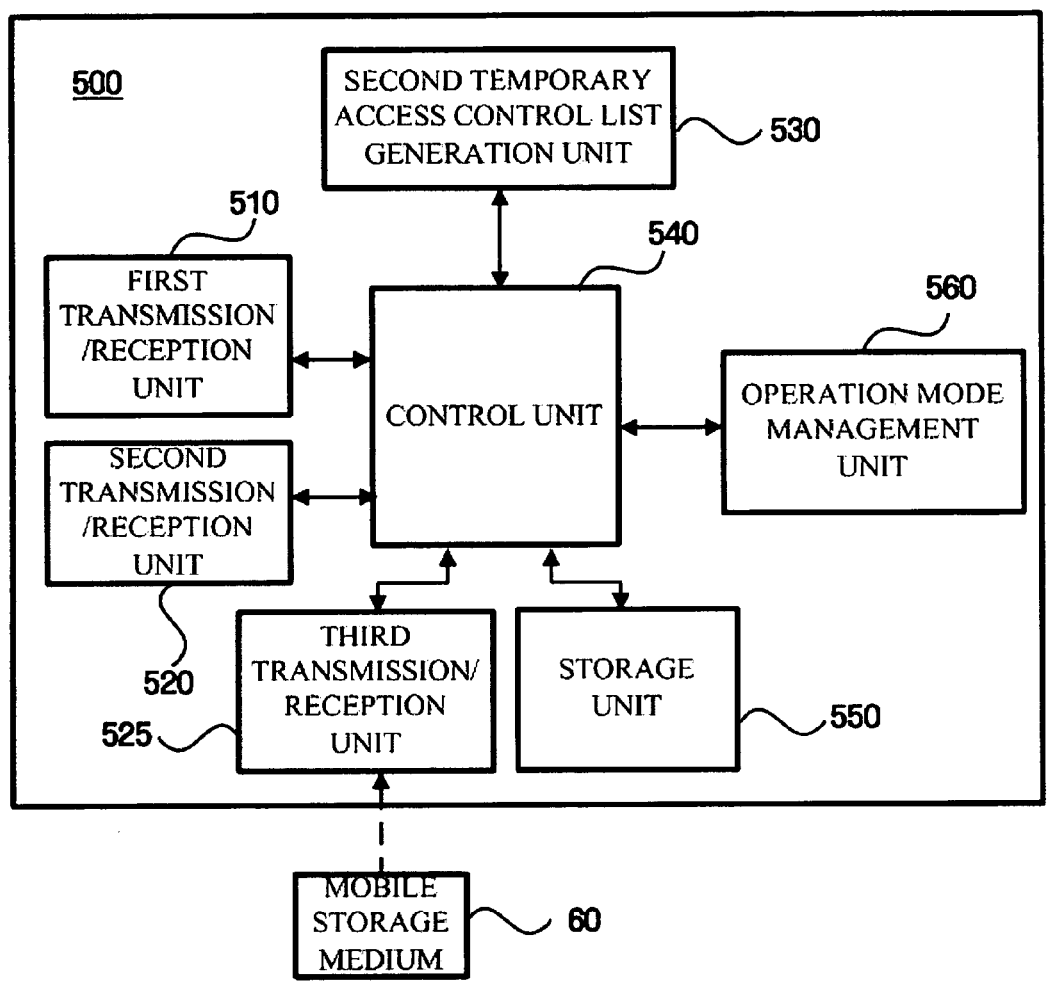
FIG. 6A is a block diagram of a controlled device in the home network system of FIG. 2A, according to an exemplary embodiment of the present invention.
Figure 6B:
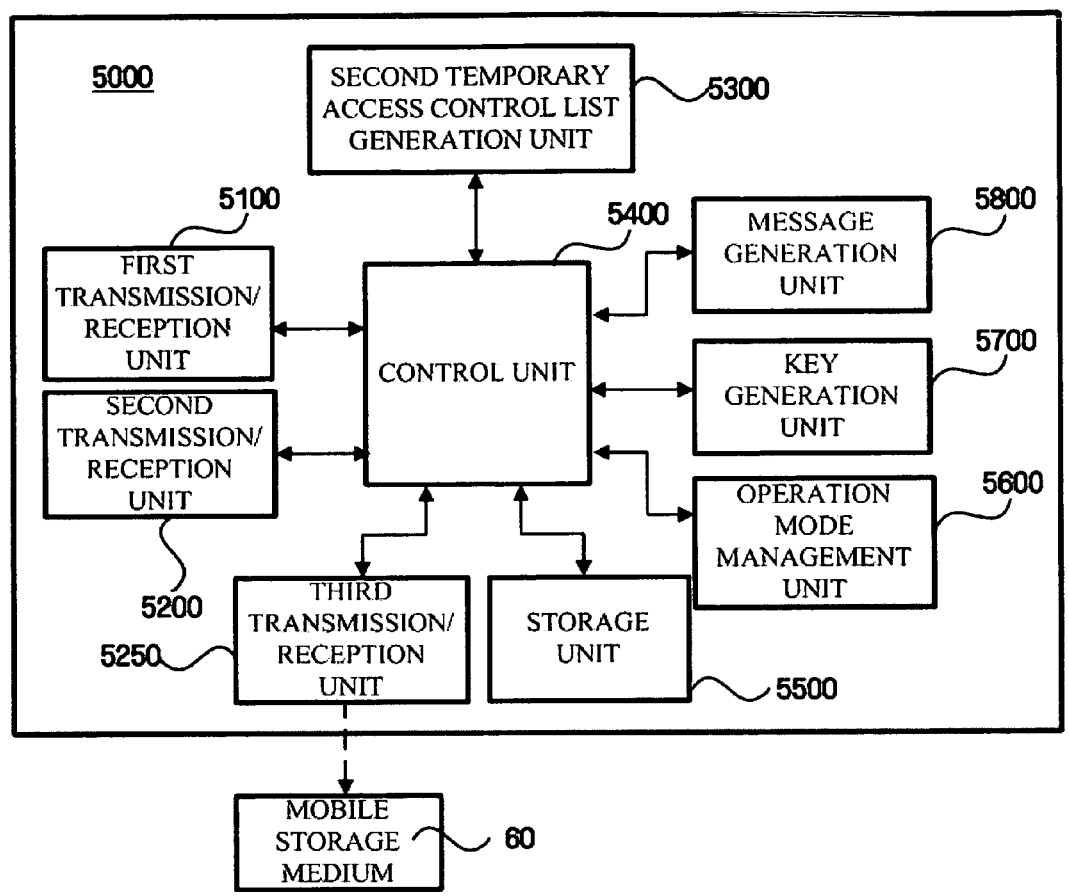
FIG. 6B is a block diagram of a controlled device in the home network system of FIG. 2B, according to another exemplary embodiment of the present invention.

FIG. 6A is a block diagram of the controlled device 500 according to an exemplary embodiment of the present invention, and FIG. 6B is a block diagram of the controlled device 5000 according to another exemplary embodiment of the present invention.

First, the controlled device 500 will be described with reference to FIG. 6A.

The controlled device 500 includes a storage unit 550, a first transmission/reception unit 510, a second transmission/reception unit 520, a third transmission/reception unit, a second temporary access control list generation unit 530, an operation mode management unit 560, and a control unit 540.

The storage unit 550 may store an access control list and a second temporary access control list generated in the second temporary access control list generation unit 530. The access control list includes access control information with respect to each access control subject. The access control list will be described with reference to FIG. 7.

Figure 7:
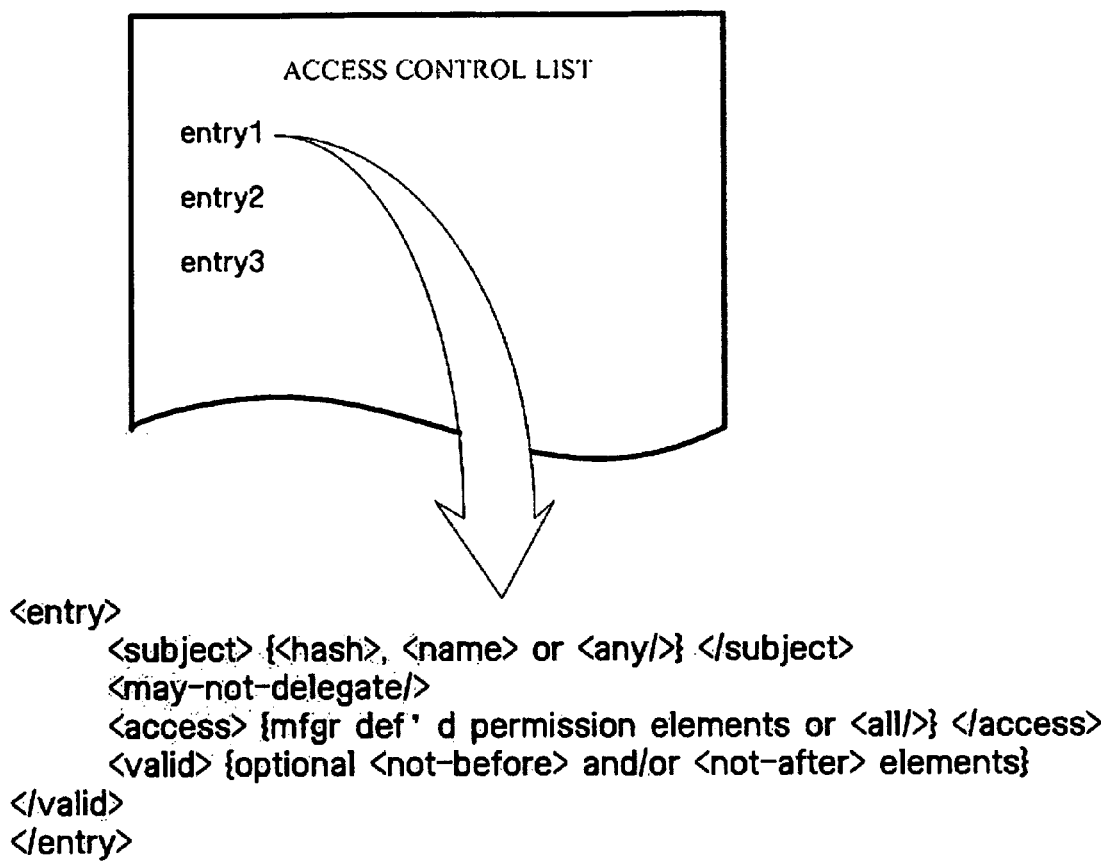
FIG. 7 illustrates entries forming an access control list expressed as an XML, according to an exemplary embodiment of the present invention.

FIG. 7 illustrates entries forming an access control list expressed as an XML, according to an exemplary embodiment of the present invention.

Each entry shown in FIG. 7 indicates access control information with respect to each access control subject.

In a document illustrated in FIG. 7, a subject tag is used to identify the control point 41 requesting a service. Thus, identification information for identifying the control point 41, such as the public key and address of the control point 41, is inserted into the subject tag.

More specifically, a hash value of the public key of the control point 41 is inserted into a hash tag within the subject tag. The name of the control point 41 is inserted into a name tag within the subject tag. If the value of the name tag is "any", all the control points 41 and 42 may be access control subjects of the controlled device 500.

An access tag indicates service control information available to the control point 41 identified through the subject tag. For example, when the controlled device 500 is an audio device, the service control information may be information about the use and control of a service provided by the controlled device 500 such as playback, stop, volume control, and music file downloading. The control unit 540 of the controlled device 500 can determine the type of a service available to an access control subject through the access tag and, upon receiving a request for a service that is not set in the access tag, may output an error message or may not respond to the request.

A valid tag is used to control a service available time. For example, when a not-before tag is used, a service cannot be used prior to a date set in the not-before tag. Similarly, when a not-after tag is used, a service cannot be used after a date set in the not-after tag.

The access control list includes such entries for each access control subject.

The storage unit 550 may store authentication such as the serial number and ID of the controlled device 500 and a pair of the public key and the private key of the controlled device 500. The pair of the public key and the private key of the controlled device 500 may be used to encrypt or decrypt data exchanged between the controlled device 500 and a network device (e.g., the security console 300 and the control point 41). The storage unit 550 may be, but not is limited to, a memory device such as an ROM, a PROM, an EPROM, an EEPROM, an RAM, or a flash memory.

The second temporary access control list generation unit 530 generates a second temporary access control list in which the control point 41 is not designated. In other words, an entry where the value of the hash tag in the subject tag is not set is generated. At this time, service control items included in the second temporary access control list may be restrictive when compared to those included in the access control list. This is because the controlled device 500 can be protected from the internal control points 41 and 42 by restricting the service control items of the controlled device 500. It is preferable that the second temporary access control list be generated before the controlled device 500 joins a predetermined network.

The controlled device 500 may receive the public key of the internal control point 41 from the security console 300. At this time, the second temporary access control list generation unit 530 edits the second temporary access control list to add the received public key. In other words, the received public key of the control point 41 is added to the second temporary access control list in which the control point 41 is not designated.

The controlled device 500 may receive at least one public key from the security console 300. When the controlled device 500 receives n public keys (n is a natural number), the second temporary access control list generation unit 530 copies entries of the previously generated second temporary access control list. In other words, the second temporary access control list generation unit 530 generates n entries in which the public key of the control point 41 is not designated. Next, the second temporary access control list generation unit 530 edits the second temporary access control list by adding the received public key to each of the entries. The first transmission/reception unit 510 transmits and receives data between the controlled device 500 and the security console 300. For example, the first transmission/reception unit 510 may transmit a message and authentication information indicating the existence of the controlled device 500 to the security console 300. The first transmission/reception unit 510 may receive the public key request message and the authentication information request message from the security console 300.

If the security console 300 successfully authenticates the controlled device 500, the first transmission/reception unit 510 may receive the public key of the internal control point 41 from the security console 300. At this time, the first transmission/reception unit 510 may receive at least one public key.

The second transmission/reception unit 520 may transmit and receive data between the controlled device 500 and the control point 41. For example, the second transmission/reception unit 520 may receive a service request signal from the control point 41. The second transmission/reception unit 520 may also transmit the access control reject message to the control point 41. The second transmission/reception unit 520 may be separately implemented as hardware or may be integrated with the first transmission/reception unit 510.

The operation mode management unit 560 may switch the operation mode of the controlled device 500 to a predetermined mode. The operation mode of the controlled device 500 according to the present exemplary embodiment includes a normal mode and a guest mode. In the normal mode, a service is provided from the controlled device 500 to the control point 400 based on the access control list. In the guest mode, a service is provided from the controlled device 500 to the control point 400 based on the second temporary access control list.

When the controlled device 500 joins a predetermined network and is set to operate in the normal mode, the controlled device 500 is registered in the security console 300 according to the conventional UPnP security mechanism.

If the operation mode of the controlled device 500 is set to the guest mode, the controlled device 500 is authenticated by the security console 300 and receives the public key of the internal control point 41 from the security console 300.

The second temporary access control list generation unit 530 of the controlled device 500 edits a previously generated second temporary access control list using the received public key.

The controlled device 500 is switched to the guest mode by the operation mode management unit 560. The controlled device 500 switched to the guest mode provides a service to the control point 400 based on the edited second temporary access control list.

The controlled device 500 according to the present exemplary embodiment may further include a third transmission/reception unit 525. The third transmission/reception unit 525 may transmit and receive data between the mobile storage medium 60 such as a smart card and the controlled device 500. For example, the third transmission/reception unit 470 may receive the public key of the internal control point 41 from the mobile storage medium 60. It is preferable that the public key of the internal control point 41 be stored in the mobile storage medium 60 before the controlled device 500 joins a network.

Next, the controlled device 5000 according to another exemplary embodiment of the present invention will be described with reference to FIG. 6B. The controlled device 5000 may further include a key generation unit 5700 in addition to the configuration illustrated in FIG. 6A.

The key generation unit 5700 generates a pair of keys including a second temporary public key and a second temporary private key. It is preferable that the pair of keys including the second temporary public key and the second temporary private key be generated before the controlled device 5000 joints a predetermined network. When the controlled device 500 is successfully authenticated by the security console 3000, the pair of keys including the second temporary public key and the second temporary private key may be transmitted to the security console 3000 through a first transmission/reception unit 5100.

A second access control list generation unit 5300 generates a second temporary access control list including a second temporary public key generated in the key generation unit 5700. In other words, the second temporary access control list having the hash value of the second public key is generated using the value of the hash tag within the subject tag. If the controlled device 5000 operates in the guest mode within a predetermined network, the generated second temporary access control list is used when a predetermined service is provided to the internal control point 4000.

A storage unit 5500 may store authentication information of the controlled device 5000 such as the serial number and ID of the controlled device 5000, the pair of keys including the public key and the private key of the controlled device 5000, and the pair of keys including the second temporary public key and the second temporary private key generated in the key generation unit 5700. The storage unit 5500 may also store the second temporary access control list generated in the second temporary access control list generation unit 5300. The storage unit 5500 may be, but is not limited to, a memory device such as an ROM, a PROM, an EPROM, an EEPROM, an RAM, or a flash memory.

The first transmission/reception unit 5100 transmits and receives data between the controlled device 5000 and the security console 3000. For example, when the controlled device 5000 is successfully authenticated by the security console 3000, the first transmission/reception unit 5100 transmits the pair of keys including the second temporary public key and the second temporary private key generated in the key generation unit 5700 to the security console 3000.

A second transmission/reception unit 5200 transmits and receives data between the controlled device 5000 and the control point 4000. For example, the second transmission/reception unit 5200 receives a service request signal from the control point 4000.

A control unit 5400 determines whether a message received from the control point 4000 is valid. The validity of the received message can be determined based on a public key included in the received message. In other words, upon receiving the message from the control point 4000, the control unit 5400 refers to access control lists stored in the storage unit 5500 to determine whether there is an access control list having a public key that is the same as the public key included in the received message.

When there is no access control list having a public key that is the same as the public key included in the received message, the control unit 5400 generates an access control reject message through a message generation unit 5800. The control unit 5400 then transmits the access control reject message to the control point 4000 through the second transmission/reception unit 5200.

If there is an access control list having a public key that is the same as the public key included in the received message, the controlled device 5000 may request a service from the control point 4000.

Figure 8:
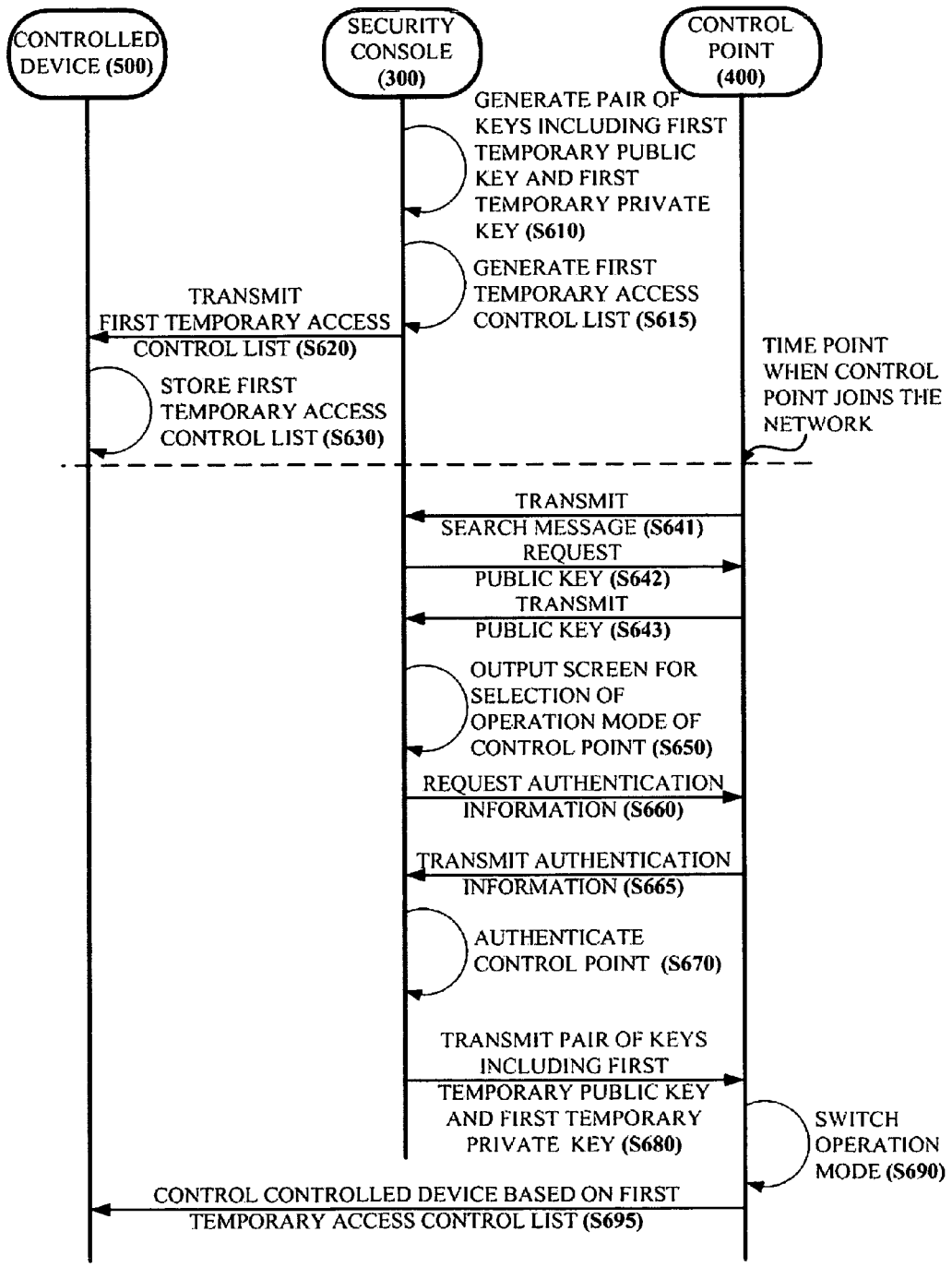
FIG. 8 is a conceptual view of access control with respect to a control point in the home network system of FIG. 2A, according to an exemplary embodiment of the present invention.

FIG. 8 illustrates a method for providing a security service according to an exemplary embodiment of the present invention, in which authentication of the control point 400 operating in the guest mode is illustrated as an example.

In operation S610, the key generation unit 390 of the security console 300 generates a pair of keys including a first temporary public key and a second temporary private key.

In operation S615, the first temporary access control list generation unit 330 of the security console 300 edits a first temporary access control list of the controlled device 500 using the first temporary public key generated in the key generation unit 390. In other words, the first temporary public key is added to the first temporary access control list of the controlled device 500. It is preferable that the first temporary access control list be edited using the first temporary public key when a predetermined control point joins a network. The first temporary access control list is transmitted to from the security console 300 to the controlled device 500 in operation S620 and the controlled device 500 stores the first temporary access control list in operation S630.

When the predetermined control point 400 joins a network from the outside, the security console 300 receives a search message for searching for the security console 300 in operation S641.

After receiving the search message from the control point 400, the security console 300, transmits a public key request message to the control point 400 in operation S642.

Upon receiving a public key from the control point 400 in operation S643, the UI management unit 385 of the security console 300 outputs the screen 900 of FIG. 4 that allows selection of the operation mode of the control point 400 through the display unit 380 in operation S650. At this time, the operation mode of the control point 400 can be selectively set by a user.

When the operation mode of the control point 400 is set to a normal mode, the control point 400 is registered in the security console 300 as a home device within a network according to an UPnP security mechanism.

If the operation mode of the control point 400 is set to a guest mode, the authentication unit 350 of the security console 300 requests authentication information from the control point 400 in operation S660.

The control point 400 transmits authentication information, e.g., the serial number of the control point 400, to the security console 300 at the request of the security console 300 in operation S665.

Upon receiving authentication information from the control point 400, the authentication unit 350 of the security console 300 outputs the received authentication information through the display unit 380.

The user checks the displayed authentication information, e.g., the serial number of the control point 400, in order to authenticate the control point 400 in operation S670.

When the user inputs an authentication confirm command, the control unit 340 of the security console 300 transmits the pair of keys including the first temporary public key and the first temporary private key generated in the key generation unit 390 to the control point 400 through the first transmission/reception unit 310 in operation S680.

Upon receiving the first temporary public key from the security console 300, the control point 400 may be switched to the guest mode by the operation mode management unit 430.

When the control device 400 switched to the guest mode generates a service request signal with respect to the internal controlled device 51, the control point 400 generates the service request signal including the first temporary public key.

After receiving the service request signal from the control point 400, the controlled device 51 determines the validity of the received signal. In other words, the controlled device 51 refers to access control lists to determine whether there is an access control list including the first temporary public key included in the received signal.

Since there is a first temporary access control list including the first temporary public key in the controlled device 51, the controlled device 51 can provide a requested service to the control point 400 in operation S695.

According to another exemplary embodiment of the present invention, the pair of keys including the first temporary public key and the first temporary private key generated in the key generation unit 390 of the security console 300 may be transmitted to the control point 400 through the mobile storage medium 60 such as a smart card.

More specifically, the user of the security console 300 may store the pair of keys including the first temporary public key and the first temporary private key in the mobile storage medium 60 through the third transmission/reception unit 325 of the security console 300. At this time, data exchange between the mobile storage medium 60 and the security console 300 may be performed in a contact or a non-contact manner.

When the control point 400 joins a network from the outside, the user transmits the pair of keys including the first temporary public key and the first temporary private key stored in the mobile storage medium 60 to the control point 400 through the third transmission/reception unit 470 of the control point 400.

After receiving the pair of keys including the first temporary public key and the first temporary private key from the mobile storage medium 60, the control point 400 is switched to the guest mode by the operation mode management unit 430. The control point 400 then generates a control signal including the first temporary public key and requests a predetermined service from the internal controlled devices 51 and 52.

Figure 9:
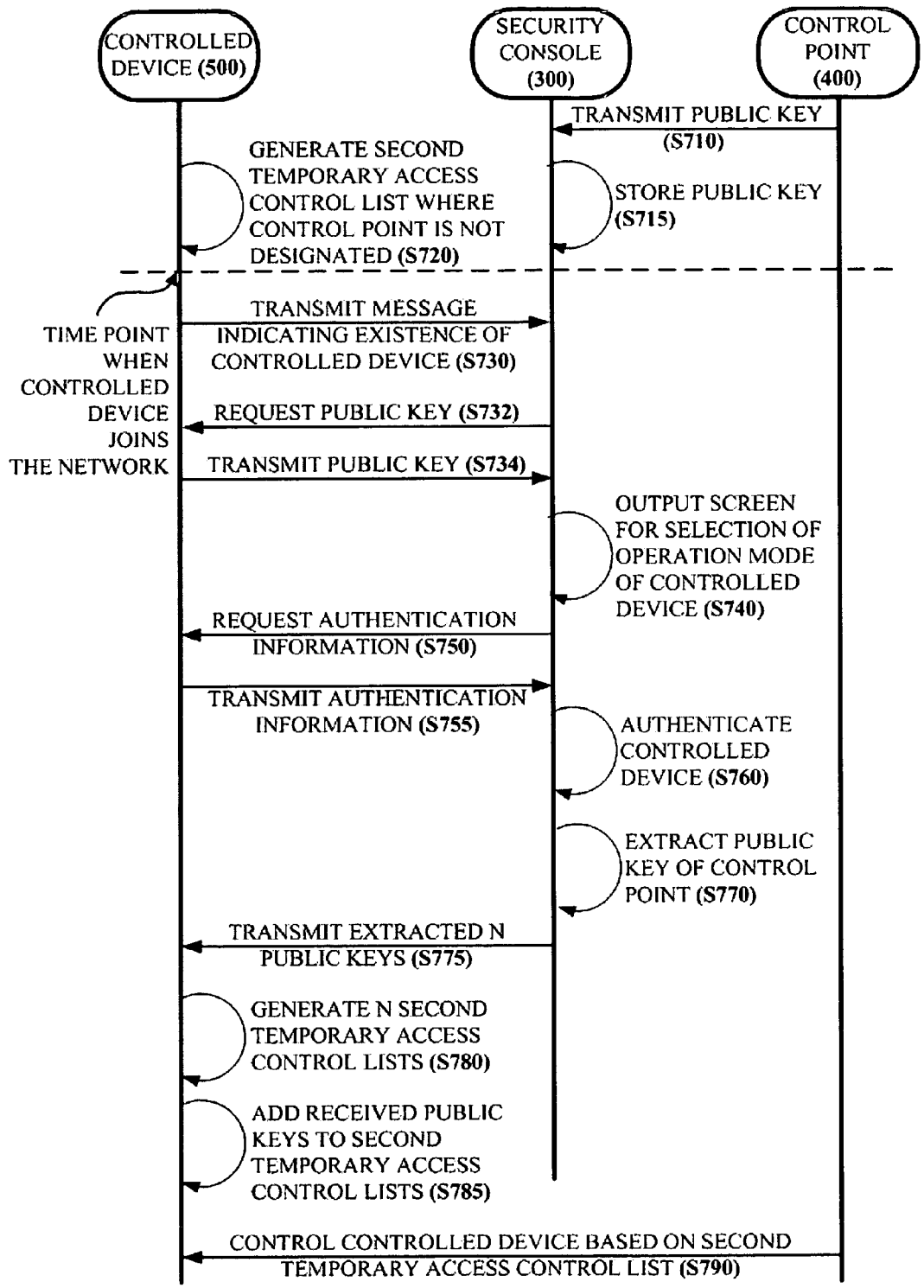
FIG. 9 is a conceptual view of access control with respect to a controlled device in the home network system of FIG. 2A, according to another exemplary embodiment of the present invention.

FIG. 9 is a conceptual view of access control with respect to a controlled device 500 in the home network system of FIG. 2A.

Initially, the control point 400 transmits a public key to the security console 300 in operation S710 and the security console 300 stores the public key received from the control point 400 in operation S715. The controlled device 500 first generates a second temporary access control list in which the internal control point 41 is not designated through the second temporary access control list generation unit 530 in operation S720. At this time, it is preferable that the second temporary access control list be generated before the controlled device 500 is connected to a predetermined network.

When the controlled device 500 joins a predetermined network, the controlled device 500 generates a message indicating its existence and transmits the message to the security console 300 according to an UPnP security mechanism in operation S730.

After receiving the message from the controlled device 500, the security console 300, requests a public key from the controlled device 500 in operation S732. The controlled device 500 transmits the public key of the controlled device 500 to the security console 300 at the request of the security console 300 in operation S734.

Upon receiving the public key from the controlled device 500, the UI management unit 385 of the security console 300 outputs the screen 900 of FIG. 4 that allows selection of the operation mode of the controlled device 500 through the display unit 380 in operation S740. At this time, the operation mode of the controlled device 500 can be selectively set by the user.

When the operation mode of the controlled device 500 is set to a normal mode, the controlled device 500 is registered in the security console 300 as a home device within a network.

If the operation mode of the controlled device 500 is set to the guest mode, the control unit 340 of the security console 300 requests authentication information from the controlled device 500 in operation S750.

The controlled device 500 transmits authentication information of the controlled device 500, e.g., the serial number of the controlled device 500, to the security console 300 at the request of the security console 300 in operation S755.

Upon receiving the authentication information from the controlled device 500, the authentication unit 350 of the security console 300 outputs the received authentication information through the display unit 380.

The user checks the displayed authentication information, e.g., the serial number of the controlled device 500, in order to authenticate the controlled device 500 in operation S760. Upon receiving an authentication confirm command from the user, the control unit 340 of the security console 300 searches for the storage unit 360 to extract a public key of the internal control points 41 and 42 in operation S770.

Next, the control unit 340 of the security console 300 transmits the extracted public key of the control points 41 and 42 to the controlled device 500 through the second transmission/reception unit 320 in operation S775. At this time, at least one public key of the control points 41 and 42 may be transmitted to the controlled device 500.

Upon receiving the public key of the pre-registered control point 400 from the security console 300, the second temporary access control list generation unit 530 of the controlled device 500 edits the second temporary access control list. In other words, the received public key is added to the second temporary access control list where the control points 41 and 42 are not designated to indicate the control points 41 and 42 in operation S785.

When n public keys are received from the security console 300, the second temporary access control list generation unit 530 copies a template of the previously generated second temporary access control list and generates n second temporary access control lists in operation S780. The second temporary access control list generation unit 530 adds the received public keys to the second temporary access control lists to designate the control points 41 and 42 in operation S785.

Next, the controlled device 500 may be switched to the guest mode by the operation mode management unit 560. The controlled device 500 switched to the guest mode may provide a predetermined service to the control points 41 and 42 based on the second temporary access control list including the public key of the control points 41 and 42 in operation S790.

In more detail regarding a process of providing a service to the control points 41 and 42 from the controlled device 500, the control unit 540 of the controlled device 500 determines the validity of a service request signal received from the control points 41 and 42. In other words, the control unit 540 of the controlled device 500 searches for the storage unit 550 to determine whether there is a second temporary access list including a public key included in the received signal.

Since there is the second temporary access control list including the public key of the control points 41 and 42 in the controlled device 500, the controlled device 500 can provide a requested service to the control points 41 and 42 in operation S790.

According to another exemplary embodiment of the present invention, the public key of the control points 41 and 42 extracted by the security console 300 may be transmitted to the controlled device 400 through the mobile storage medium 60, e.g., a smart card.

More specifically, once the public key of the control points 41 and 42 is extracted by the security console 300, the user of the security console 300 stores the extracted public key of the control points 41 and 42 in the mobile storage medium 60 through the third transmission/reception unit 325 of the security console 300. At this time, data exchange between the mobile storage medium 60 and the security console 300 may be performed in a contact or a non-contact manner.

Thereafter, when the controlled device 500 joins a network from the outside, the user transmits the public key of the control points 41 and 42 stored in the mobile storage medium 60 to the controlled device 500 through the third transmission/reception unit 525 of the controlled device 500.

The second temporary access control list generation unit 530 of the controlled device 500 edits the previously generated second temporary access control list to add the public key of the control points 41 and 42 received from the mobile storage medium 60.

Figure 10:
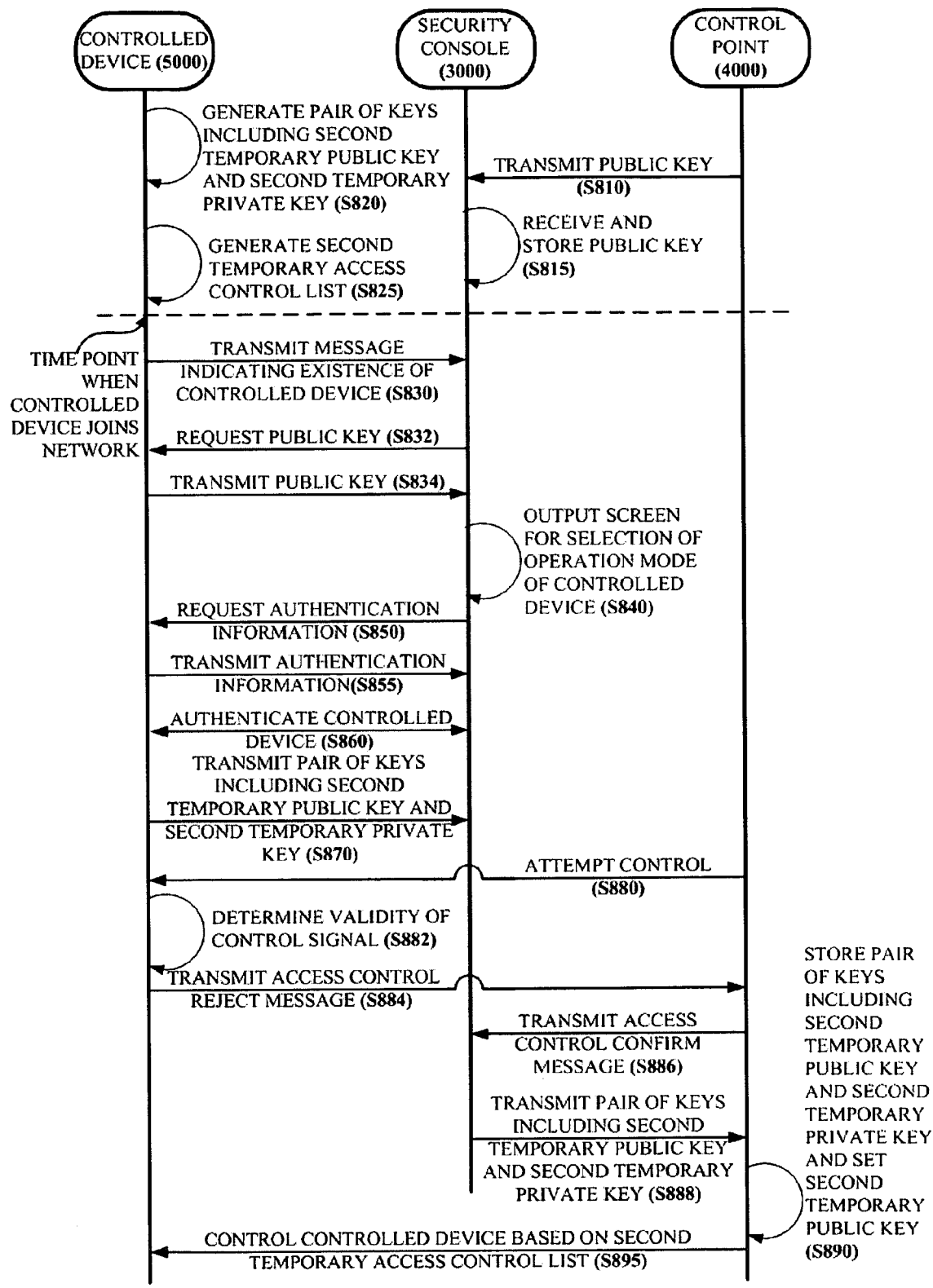
FIG. 10 is a conceptual view of access control with respect to a controlled device in the home network system of FIG. 2B, according to another exemplary embodiment of the present invention.

FIG. 10 is a conceptual view of access control with respect to a controlled device 5000 in the home network system of FIG. 2B.

Initially, the control point 4000 transmits a public key to the security console 300 in operation S810 and the security console 3000 stores the public key received from the control point 4000 in operation S815. The controlled device 5000 generates a pair of keys including a second temporary public key and a second temporary private key through the key generation unit 570 in operation S820.

The second temporary access control list generation unit 5300 of the controlled device 5000 generates a second temporary access control list including a second temporary public key as identification information of the control point 4000 in operation S825. It is preferable that the second temporary access control list be generated before the controlled device 5000 joins a predetermined network.

When the controlled device 500 joins the predetermined network, the controlled device 5000 generates a message indicating its existence and transmits the message to the security console 3000 according to an UPnP security mechanism in operation S830.

The controlled device 5000 transmits its public key to the security console 3000 at the request of the security console 3000 in operation S834.

Upon receiving the public key from the controlled device 5000, the UI management unit 385 of the security console 3000 outputs the screen 900 of FIG. 4 that allows selection of the operation mode of the controlled device 5000 through the display unit 380 in operation S840. At this time, the operation mode of the controlled device 5000 may be selectively set by a user.

When the operation mode of the controlled device 5000 is set to a guest mode, the authentication unit 350 of the security console 3000 requests authentication information from the controlled device 5000 in operation S850.

The controlled device 5000 transmits authentication information of the controlled device 5000, e.g., the serial number of the controlled device 5000, to the security console 3000 at the request of the security console 3000 in operation S855.

Upon receiving the authentication information from the controlled device 5000, the authentication unit 350 of the security console 3000 outputs the received authentication information through the display unit 380.

The user checks the displayed authentication information, e.g., the serial number of the controlled device 5000, in order to authenticate the controlled device 5000.

The controlled device 5000 that is successfully authenticated by the security console 3000 may be switched to the guest mode by the operation mode management unit 5600. When the controlled device 5000 is switched to the guest mode, the control unit 5400 of the controlled device 5000 transmits the pair of keys including the second temporary public key and the second temporary private key generated in the key generation unit 5700 to the security console 3000 through the first transmission/reception unit 5100 in operation S884.

The security console 3000 stores the pair of keys including the second temporary public key and the second temporary private key received from the controlled device 5000 in the storage unit 360.

The control point 4000 within a network may attempt access control with respect to the controlled device 500 in operation S880. At this time, the control point 4000 generates a control signal including its public key and transmits the message to the controlled device 5000.

After receiving the control signal from the control point 4000, the controlled device 5000, determines the validity of the received control signal in operation S882. In other words, the control unit 5400 of the controlled device 5000 searches for the storage unit 5500 to determine whether there is a second temporary access control list including a public key included in the received control signal.

Since the there is no second temporary access control list including the public key included in the received control signal, the control unit 5400 generates an access control reject message through the message generation unit 5800 and transmits the access control reject message to the control point 4000 through the second transmission/reception unit 5200 in operation S884.

After receiving the access control reject message from the controlled device 5000, the control point 4000, generates an access control confirm message asking where access control with respect to the controlled device 5000 is available through the message generation unit 460. The control point 4000 transmits the access control confirm message to the security console 3000 through the first transmission/reception unit 410 in operation S886.

The message processing unit 370 of the security console 3000 determines whether the access control confirm message is received from the control point 4000. When the access control confirm message is received, the control unit 340 of the security console 3000 transmits the pair of keys including the second temporary public key and the second temporary private key stored in the storage unit 360 to the control point 4000 through the first transmission/reception unit 310 in operation S888.

The control point 4000, receiving the pair of keys including the second temporary public key and the second temporary private key from the security console 3000, stores the pair of the second temporary public key and the second temporary private key in the storage unit 450 and sets a second temporary public key in operation S890. The control point 4000 generates a service request signal including the second temporary public key in the generation of the service request signal with respect to the controlled device 5000.

The controlled device 5000 receiving the service request signal from the control point 4000 determines the validity of the received signal in operation S882. In other words, the control unit 5400 of the controlled device 5000 searches for the storage unit 5500 to determine whether there is a second temporary access control list including the second public key included in the received signal.

Since there is the second temporary access control list including the second public key included in the received signal, the control unit 5400 of the controlled device 5000 may provide a requested service to the control point 4000 in operation S895.

According to another exemplary embodiment of the present invention, the pair of keys including the second temporary public key and the second temporary private key generated in the controlled device 5000 may be transmitted to the control point 4000 through the mobile storage medium 60, e.g., a smart card.

More specifically, after the pair of keys including the second temporary public key and the second temporary private key is generated in the controlled device 5000, a user stores the pair of the second temporary public key and the second temporary private key in the mobile storage medium 60 through the third transmission/reception unit 5250 of the controlled device 5000. At this time, data exchange between the mobile storage medium 60 and the controlled device 5000 may be performed in a contact or a non-contact manner.

Thereafter, when the user and the controlled device 5000 join a predetermined network, the user transmits the pair of keys including the second temporary public key and the second temporary private key stored in the mobile storage medium 60 to the security console 3000 through the third transmission/reception unit 325 of the security console 3000. At this time, data exchange between the mobile storage medium 60 and the security console 3000 may be performed in a contact or a non-contact manner.

Upon receiving an access control confirm message from the control point 4000, the security console 3000 transmits the pair of keys including the second temporary public key and the second temporary private key received from the mobile storage medium 60 to the control point 4000.

As described above, the apparatus and method for providing a security service of the present invention according to the present invention may provide the following advantages.

First, when a control point joins a network from the outside, the control point can request a predetermined service from a controlled device within the network without being registered in a security console.

Second, when a controlled device joins a network from the outside, the controlled device can provide a service to control points within the network without being registered in a security console.

Third, by using a mobile storage medium, when a network device joins a network from outside, the network device can be connected to another network device within the network without being authenticated by a security console.

While an apparatus and method for providing a security service according to the present invention have been particularly shown and described with reference to exemplary embodiments and drawings, it will be understood by those of ordinary skill in the art that various changes in form and details may be made therein without departing from the spirit and scope of the present invention as defined by the following claims.

What is claimed is:

1. An apparatus for providing a security service, the apparatus comprising:

at least one hardware processor programmed to implement:
    a key generator which generates a first temporary public key and a first temporary private key for an external network device that will be connected with a network,
    a temporary access control list generator which generates a first temporary access control list including the first temporary public key for an internal network device, and
    an authenticator which performs authentication if the external network device joins in the network; and
a first transmitter and receiver which transmits the first temporary public key and the first temporary private key to the external network device after the authentication is successfully performed by the authenticator,
wherein the first temporary access control list provides, to the external network device, restricted access to one or more services of the internal network device,
wherein the key generator generates the first temporary public key and the first temporary private key for the external network device independently of the external network device, and the temporary access control list generator generates the first temporary access control list independently of the external network device,
wherein the external network device controls the internal network device based on the first temporary access control list, and
wherein the apparatus further comprises a second transmitter and receiver which transmits a public key of the internal network device to the external network device according to the result of the authentication performed by the authenticator.

2. The apparatus of claim 1, the second transmitter and receiver receives a second temporary public key and a second temporary private key added to a second temporary access control list generated by the external network device.

3. The apparatus of claim 2, further comprising a third transmitter and receiver which transmits at least one of the first temporary public key and the first temporary private key, and the public key of the internal network device to a mobile storage medium and receives the second temporary public key and the second temporary private key from the mobile storage medium.

4. A method for providing a security service, the method comprising:
    generating a first temporary public key and a first temporary private key for an external network device that will be connected with a network;
    generating, by a computer apparatus, a first temporary access control list, including the first temporary public key, for an internal network device of the network;
    authenticating the external network device that joins the network; and
    transmitting the first temporary public key and the first temporary private key to the external network device after the authenticating is successfully performed,
wherein the first temporary access control list provides, to the external network device, restricted access to one or more services of the internal network device, and
wherein the first temporary public key and the first temporary private key for the external network device are generated independently of the external network device, and the first temporary access control list is generated independently of the external network device,
wherein the external network device controls the internal network device based on the first temporary access control list, and
wherein the method further comprises transmitting a public key of the internal network device to the external network device according to the result of the authenticating.

5. The method of claim 4, wherein the authenticating comprises selectively receiving an input of an operation mode of the external network device.

6. The method of claim 4, further comprising receiving a second temporary public key and a second temporary private key from the external network device according to the result of the authenticating.

7. The method of claim 6, wherein the receiving the second temporary public key and the second temporary private key comprises transmitting the second temporary public key and the second temporary private key to the internal network device if an access control confirm message with respect to the external network device is received from the internal network device.

8. The apparatus of claim 1, wherein the first temporary access control list is distinct from an access control list which provides full access to the one or more services of the internal network device.

9. The apparatus of claim 1, further comprising a second transmitter and receiver which transmits the generated first temporary access control list to the internal network device.

10. The apparatus of claim 1, wherein the key generator generates the first temporary public key and the first temporary private key prior to the external network device connecting with the network.

11. The apparatus of claim 1, wherein the temporary access control list generator generates the first temporary access control list, including the first temporary public key for the external network device, for the internal network device prior to the external network device joining the network, and the first transmitter and receiver transmits, through the network, the first temporary public key and the first temporary private key to the external network device subsequent to the external network device joining the network.

12. The apparatus of claim 1, wherein the first transmitter and receiver receives a search message from the external network device, and the temporary access control list generator generates the first temporary access control list, including the first temporary public key for the external network device, prior to the first transmitter and receiver receiving the search message from the external network device.

13. The apparatus of claim 1, wherein the key generator generates the first temporary public key and the first temporary private key for an external network device that will be connected with the network in a guest mode, different from a normal mode for connecting an external network device.

* * * * *